United States Patent [19]
Davis et al.

[11] Patent Number: 6,094,807
[45] Date of Patent: Aug. 1, 2000

[54] LACING MANDREL FOR CONTAINING STATOR WEDGES

[75] Inventors: Wendell Davis, Independence; Phyllis Stinecipher, Neodesha, both of Kans.

[73] Assignee: Emerson Electric Co., St. Louis, Mo.

[21] Appl. No.: 09/100,372

[22] Filed: Jun. 19, 1998

[51] Int. Cl.[7] .................................................. B23P 19/00
[52] U.S. Cl. .............................. 29/732; 29/732; 29/736; 29/734
[58] Field of Search ............................. 29/732, 736, 596, 29/243.5, 33, 734; 242/1.1; 493/405; 66/1 R

[56] References Cited

U.S. PATENT DOCUMENTS

| | | | |
|---|---|---|---|
| 3,402,462 | 9/1968 | Walker et al. | 29/596 |
| 4,026,009 | 5/1977 | Kindig et al. | 29/596 |
| 4,614,161 | 9/1986 | Frederick | 112/121.2 |
| 5,454,156 | 10/1995 | Morr | 29/596 |
| 5,485,670 | 1/1996 | Bouman et al. | 29/732 |
| 5,860,615 | 1/1999 | Burch | 242/432.5 |

FOREIGN PATENT DOCUMENTS 2136331   9/1984   United Kingdom ..................... 29/596

*Primary Examiner*—Jessica J. Harrison
*Assistant Examiner*—Minh Trinh
*Attorney, Agent, or Firm*—Shook, Hardy & Bacon L.L.P.

[57] ABSTRACT

A lacing mandrel for use when lacing a stator has an elongate shaft with an enlarged head, or sizing plug, proximate an upper end. The sizing plug permits an operator to easily and readily determine whether the bore of the stator is obstructed, both before and after the lacing operation. The mandrel employs an annular slip ring, having a plurality of radially extending ribs, during the lacing operation. Each radially extending rib extends into a corresponding channel of the stator, which channel opens into a corresponding slot of the stator. The annular slip ring rotates with the stator during the lacing operation, such that each rib remains positioned in its corresponding channel. Thus, slot liners, or wedges, utilized on the stator are retained in their respective slots during the lacing operation, and are not forced out by the lacing needles so as to obstruct the stator bore.

8 Claims, 2 Drawing Sheets

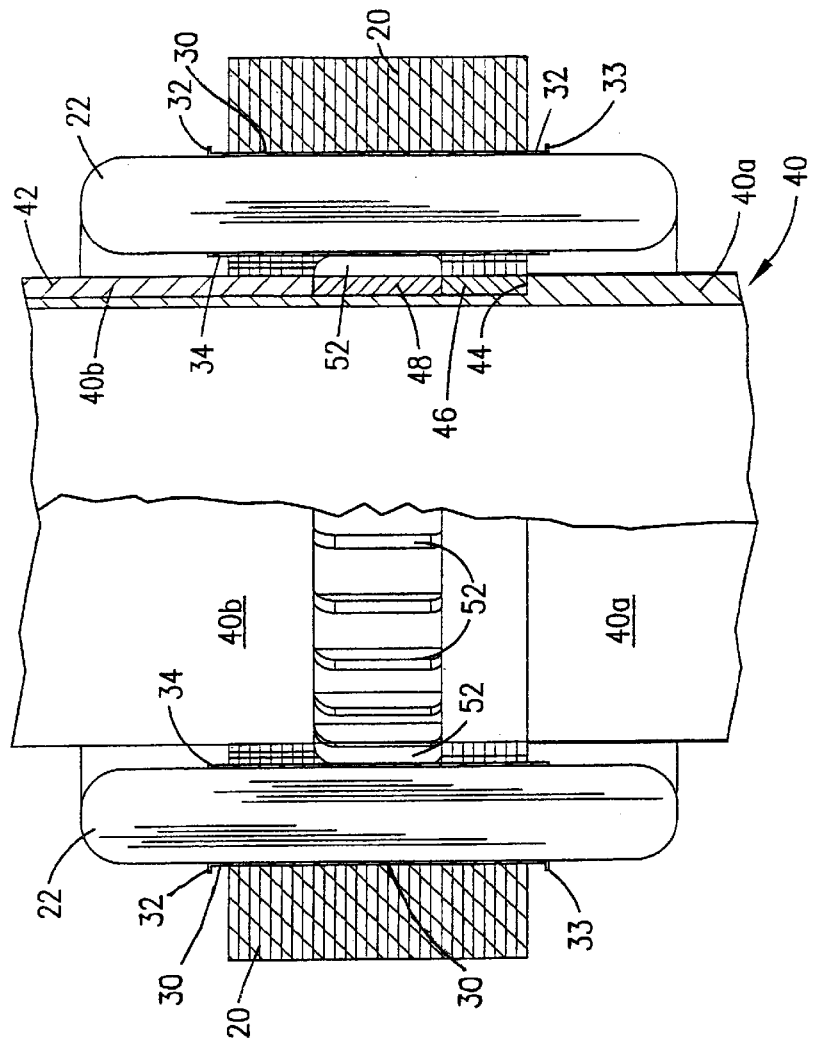
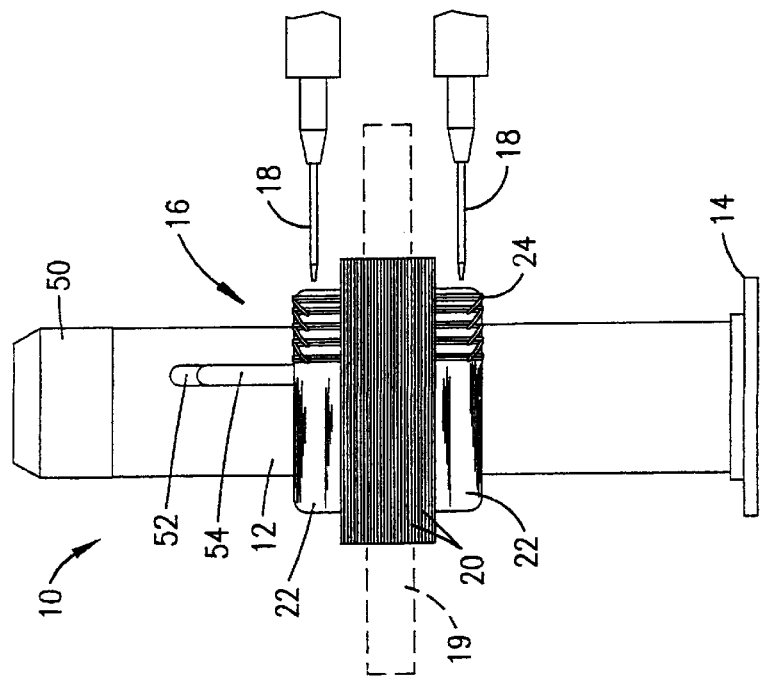

LACING MANDREL FOR CONTAINING STATOR WEDGES

BACKGROUND OF THE INVENTION

1. Field of the Invention

The present invention is generally directed to a unique lacing mandrel for use when lacing a stator.

2. Description of the Related Art

The construction of laced stators, used in electric motors, is well known. These stators have a number of metallic laminates stacked together to form a core. The stator core forms an annulus having a central opening, or bore, as it is typically called. A number of slots, spaced evenly around the stator bore, extend through the stator core. Each slot opens to the stator bore via a corresponding small channel.

Wedges, typically made of Mylar, line each slot. Particularly, each slot has one wedge (or liner) which generally lines the inner periphery of the slot, and another wedge, positioned in the slot, covering the small channel which opens to the stator bore.

Windings are wound through the slots, according to conventional winding techniques, and thus extend from opposite ends of the stator core. The windings are laced with string to hold the windings as close as possible to the core ends.

A known and considerable problem in the manufacture of laced stators is that, during normal lacing operation, the wedges in the slots of the stator core are undesirably moved from their original position by the lacing needles. Particularly, those wedges covering a channel are forced through their respective channel, thus forcing the wedges into the stator bore. Since a stator having wedges extending into its bore is unacceptable, an operator is required to reset the wedges, after lacing, with a wedge-set machine. While the addition of this step is undesirable, it is necessary to the manufacture of a useful, laced stator. Additionally, a visual inspection of the stator must be performed, following the wedge-set process, to insure that the wedges are clear of the stator bore.

The undesirable necessity to reset the wedges, following lacing of a laced stator, creates yet an additional problem in the manufacture of laced stators. Resetting the wedges typically pushes the windings of the stator beyond acceptable limits, thus requiring an additional manufacturing step of hammering the windings back down toward the ends of the stator core.

Accordingly, the need exists for a device which prevents stator slot wedges from being forced into the stator bore during the lacing operation. Such a device would prevent the need to reset the wedges, and then reposition the windings. The need also exists for a device used when lacing stators which prevents the additional need to visually inspect the stator bore to certify that wedges are clear of the bore. The present invention meets these needs, and overcomes the drawbacks of the prior art.

SUMMARY OF THE INVENTION

According to the invention, a lacing mandrel, for use when lacing a stator, forms an elongate shaft. Particularly, the shaft is formed of a first, cylindrical lower element and a second, cylindrical upper element. The first, cylindrical lower element has a lower portion of a first diameter, and an upper portion of a second, lesser diameter, thereby forming an annular rim about the shaft. The elongate shaft rests in a base.

The second, upper cylindrical element of the elongate shaft forms a hollow cylinder. The second, upper cylindrical element is sized to snugly fit over the upper portion of the first, lower cylindrical element of the elongate shaft. In accordance with an aspect of the invention, the second, upper cylindrical element has a head, of an enlarged diameter, proximate its upper end. As described in detail below, the head serves as a sizing plug to make it easy for an operator, by positioning the stator over the head, to determine that the stator bore is clear of protrusions, both before and after the lacing operation.

In accordance with an aspect of the invention, the elongate shaft has a plurality of radially extending ribs positioned annularly about its outer periphery. Particularly, the ribs are formed on the exterior of an annular slip ring, which fits over the upper portion of the first, lower cylindrical element of the elongate shaft. In one embodiment, the annular slip ring rests directly on the annular rim of the elongate shaft. Alternatively, in order to position the annular slip ring, one or more spacer rings may be first stacked on the annular rim of the elongate shaft, in which case the annular slip ring rests directly on the uppermost spacer ring. Thus, the annular slip ring, and any spacer rings, are supported by the annular rim on the elongate shaft. As described in detail below, the annular slip ring is positioned on a lacing mandrel at a location proximate the center of the stator during the lacing operation. Once the annular slip ring is in place, the second, cylindrical element of the elongate shaft of the lacing mandrel is positioned over the upper portion of the first cylindrical element, and is supported on the annular slip ring.

In use, the lacing mandrel is used in conjunction with a lacing mechanism employing one or more lacing needles. A stator core to be laced is placed over the mandrel, such that the lacing mandrel extends through the bore of the stator core. During this placement, the stator core is passed over the head, or sizing plug, of the lacing mandrel. In this regard, the sizing plug has a dimension approximating the dimension of a rotor to be subsequently used with the stator being laced. Accordingly, the operator can readily determine whether there are undesirable obstructions in the stator bore. The stator core, when fully positioned on the lacing mandrel, is positioned substantially centrally about the annular slip ring. In this position, the radially extending ribs of the annular slip ring extend into the channels, of the stator core, which open to the slots of the stator core. As lacing is carried out in a conventional manner, the ribs contain the Mylar wedges in their respective position within the stator slots, thus preventing the wedges from being forced through the channels and into the stator bore. As the stator is turned on the mandrel in a conventional manner, the annular slip ring also turns so that each rib remains in its corresponding slot on the stator core.

Upon completion of lacing, the stator core is removed from the lacing mandrel. The removal of the stator core from the mandrel requires the stator core to be again passed over the sizing plug, thereby permitting the operator to easily and readily determine whether any objects are undesirably obstructing the stator bore.

BRIEF DESCRIPTION OF THE DRAWINGS

The objects and features of the invention noted above are explained in more detail with reference to the drawings, in which like reference numerals denote like elements, and in which:

FIG. 1 is a side elevational view of a lacing mandrel of the present invention, schematically illustrating lacing needles and illustrating a nest for the stator in broken lines;

FIG. 2 is an enlarged, cross-sectional view of the lacing mandrel of the present invention, with a stator core positioned thereon, and with portions broken away for illustration;

DETAILED DESCRIPTION OF THE INVENTION

Figure 4:
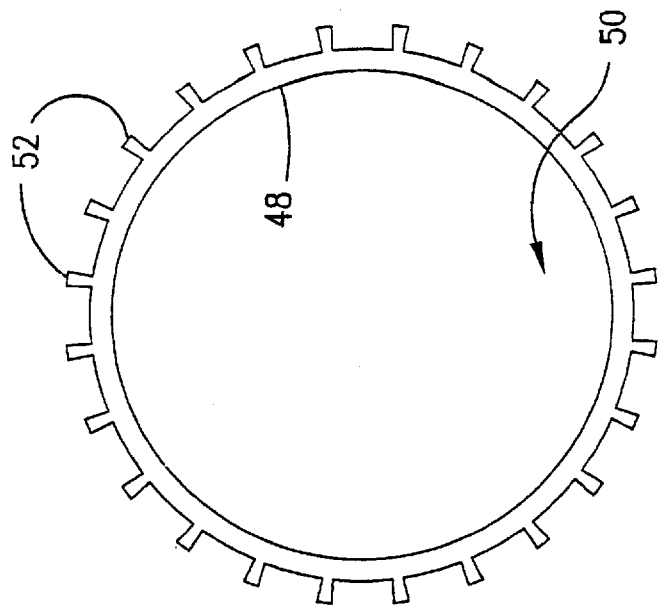
FIG. 4 is a top plan view of an annular slip ring, having radially extending ribs, utilized by the lacing mandrel of the present invention.

With reference initially to the figures, a lacing mandrel, denoted generally by reference numeral 10, is illustrated and described. Lacing mandrel 10 generally has an elongate, cylindrical shaft 12, and a base 14.

As illustrated, elongate cylindrical shaft 12 is formed of a first, lower cylindrical element 40 and a second, upper cylindrical element 42. Preferably, each element 40, 42 of shaft 12 is formed of metal. The first, lower cylindrical element 40 has a lower portion 40a of a first diameter, and an upper portion 40b of a second, lesser diameter. The location at which portions 40a and 40b meet thereby form an annular rim, or ledge, as denoted by reference numeral 44. In the embodiment illustrated, a spacer ring 46 has been positioned over the upper portion 40b of lower, cylindrical element 40, and is located in a position so as to rest on the annular rim 44, as illustrated. In accordance with the invention, an annular slip ring, denoted by reference numeral 48, is positioned over the upper cylindrical portion 40b of the first, lower element 40, so as to rest on the spacer ring 46. It should be understood and appreciated that the spacer ring 46 is utilized for positioning of the annular slip ring 48, and may be eliminated if necessary. Additionally, one or more additional spacer rings 46 may be utilized, as needed. Accordingly, as illustrated and described, the annular slip ring 48 is supported by the annular rim 44. The second, upper cylindrical element 42 is located over portion 40b of element 40, and rests on the annular slip ring 48, as illustrated.

Figure 3:
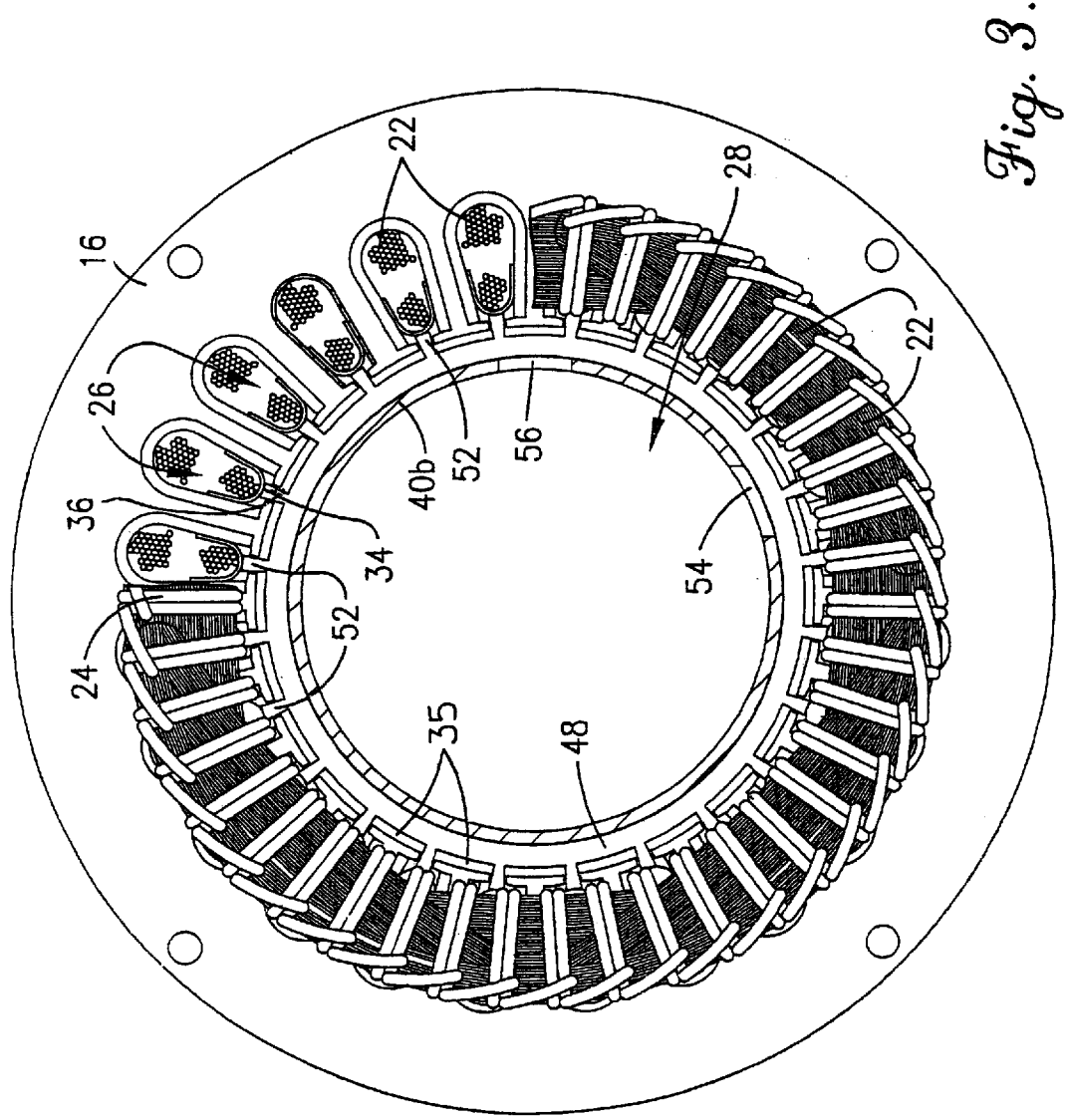
FIG. 3 is a cross-sectional top plan view of the lacing mandrel of the present invention, with a stator core positioned thereon.

Each of the upper and lower elements 40, 42 of elongate shaft 12 have a pair of elongated openings. Particularly, as illustrated in FIG. 1, the upper element 42 of shaft 12 has an elongate opening 52. Lower element 40 of shaft 12 has an elongate opening 54. As illustrated, the openings 52, 54 are in alignment with each other when the upper element 42 is placed over the upper portion 40b of lower element 40. The overlapping elongate openings 52, 54 permit an operator to place a hand-held tool into the interior of the mandrel, as needed, to facilitate the lacing process, or to untangle string, etc. An additional pair of overlapping elongate openings is provided in the mandrel 10 so as to permit lacing needles 18 to extend into the interior of the mandrel during normal lacing operation. Reference numeral 56 of FIG. 3 illustrates such an additional opening in the lower element 40.

With additional reference to FIG. 4, annular slip ring 48 of the present invention is illustrated in detail. Particularly, annular slip ring 48 forms a central opening 50, and has a plurality of radially extending ribs 52 evenly spaced about an exterior of the ring 48.

A stator core, denoted generally by reference numeral 16, is positioned on the lacing mandrel during lacing of the stator 16 by a lacing mechanism (not shown) having lacing needles 18. Stator core 16 is conventional, being formed of a number of stacked laminates 20 and windings 22,. The lacing mechanism, and particularly the needles 18, lace the windings 22 with string, in a conventional manner, to form laces 24. With additional reference to FIG. 3, as is well known, stator core 16 has a plurality of slots 26 spaced evenly about a central opening, or bore, of the stator core. The stator bore is denoted generally by reference numeral 28. Each slot 26 has a corresponding small channel 36 opening to stator bore 28.

Each slot 26 extends through the stack of laminates 20 in a conventional fashion. Each slot is lined with a Mylar slot liner 30. The liner 30 has upper and lower flanges 32, 33 as illustrated. Additionally, a Mylar wedge 34 is positioned in each slot in the manner illustrated. Particularly, each wedge 34 is positioned so as to cover its corresponding channel 36 opening to the stator bore 28. As described in detail below, the ribs 52 of annular slip ring 48 align with, and extend into, respective channels 36 of the stator core, to thereby prevent wedges 34 from becoming dislodged and forced into the bore 28 of the stator during lacing operation.

As will be appreciated, and as illustrated best in FIG. 3, the dimensions of the elongate, cylindrical shaft 12 and the annular slip ring 48 are important to the function of lacing mandrel 10. In particular, annular slip ring 48 fits snugly about the upper portion 40b of the first, lower cylindrical element 40, but in a manner so as to be rotationally mounted on the mandrel. Additionally, the dimensions of slip ring 48 are such that the exterior surface of the ring 48 and the inner peripheral surface of the stator core 16 form a plurality of spaces 35, as illustrated in FIG. 3. Additionally, as illustrated, the size and dimension of each radially extending rib 52 is such that it snugly protrudes into its respective channel 36, and engages with a corresponding wedge 34, to thereby prevent the wedge 34 from being dislodged from its corresponding slot 26 during the lacing operation.

During the lacing operation, stator core 16 is rotated, along with a stator nest 19, about lacing mandrel 10 in a conventional manner, so as to result in a laced stator as illustrated in FIG. 3. In accordance with the invention, annular slip ring 48 rotates about elongate cylindrical shaft 12, and particularly, about the upper portion 40b of the first cylindrical element 40, so that each rib 52 remains inserted in its corresponding channel 36.

In accordance with an additional aspect of the invention, lacing mandrel 10 has a sizing plug 50 positioned proximate an upper end of lacing mandrel 10. Sizing plug 50 has a diameter which is slightly greater than the diameter of the remainder of second, cylindrical portion 42. In particular, the diameter of sizing plug 50 is selected to approximate the diameter of a rotor to be utilized in conjunction with the stator. In this way, upon placement of the unlaced stator core 16 onto the mandrel 10, an operator can readily determine whether the stator bore 28 is obstructed. Similarly, upon removal of the laced stator from the mandrel 10, an operator can again readily determine, by passing the stator 16 over the sizing plug 50, whether the bore 28 of the stator 16 is obstructed, such as by wedges 34 having become dislodged. As previously described, such an obstruction is unlikely, or prevented altogether, by the unique annular slip ring 48 of the present invention.

Accordingly, the present invention provides a unique lacing mandrel which contains slot wedges of the stator in the slots during the lacing operation. Additionally, the sizing plug of the lacing mandrel permits an operator to readily and easily determine whether the stator bore is obstructed. Accordingly, additional manufacturing steps necessary in the prior art, namely, resetting the wedges after lacing and then hammering the windings back into place after the wedges are reset are avoided.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A lacing mandrel for use during lacing of a stator, said stator having a core forming an annulus with a central bore, said core having a plurality of slots therethrough, each said slot having a corresponding channel opening to said central bore, each said slot having at least one wedge therein, said mandrel comprising:

an elongate shaft, wherein said shaft is positioned through said bore of said stator core during lacing of said stator;

an annular slip ring having a central opening, wherein said annular slip ring is formed separately from and is positioned over said elongate shaft, and wherein said annular slip ring has a plurality of outwardly extending ribs, wherein each said rib aligns with a corresponding one of said slots in said stator core during lacing of said stator, to thereby contain said wedges in said slots during lacing of said stator, and wherein said annular slip ring rotates about said shaft, said elongate shaft remaining stationary.

2. The lacing mandrel as set forth in claim 1, wherein said elongate shaft has an annular rim about a periphery thereof, and wherein said annular slip ring is supported by said annular rim.

3. The lacing mandrel as set forth in claim 1, wherein said elongate shaft comprises:

a first cylindrical element having a lower portion with a first diameter, and an upper portion with a second diameter, said second diameter being less than said first diameter, wherein said first element forms an annular rim at a location where said upper and lower portions meet; and a second, cylindrical element positioned over said upper portion of said first element of said elongate shaft.

4. The lacing mandrel as set forth in claim 3, wherein said annular slip ring is positioned over said upper portion of said first element and supported by said annular rim.

5. The lacing mandrel as set forth in claim 4, wherein said second, cylindrical element is supported on said annular slip ring.

6. The lacing mandrel as set forth in claim 8, wherein said annular slip ring is positioned over said upper portion of said first cylindrical element and is supported by said annular rim, and wherein said second, cylindrical element is supported on said annular slip ring.

7. The lacing mandrel as set forth in claim 1, wherein said elongate shaft has a sizing plug proximate an upper end thereof.

8. A lacing mandrel for use during lacing of a stator, said stator having a core forming an annulus with a central bore, said core having a plurality of slots therethrough, each said slot having a corresponding channel opening to said central bore, each said slot having at least one wedge therein, said mandrel comprising:

an elongate shaft, wherein said shaft comprises a first cylindrical element having a lower portion with a first diameter, and an upper portion with a second diameter, said second diameter being less than said first diameter, wherein said first element forms an annular rim at a location where said upper and lower portions meet, and wherein said shaft further comprises a second, cylindrical element positioned over said upper portion of said first element of said elongate shaft, and wherein said shaft is positioned through said bore of said stator core during lacing of a stator;

an annular slip ring having a central opening, wherein said annular slip ring is positioned over said elongate shaft, and wherein said annular slip ring has a plurality of outwardly extending ribs, wherein each said rib aligns with a corresponding one of said slots in said stator core during lacing of said stator, to thereby contain said wedges in said slots during lacing of said stator; and a spacer ring positioned over said upper portion of said first, cylindrical element supported by said annular rim.

* * * * *